No. 759,233. Patented May 10, 1904.

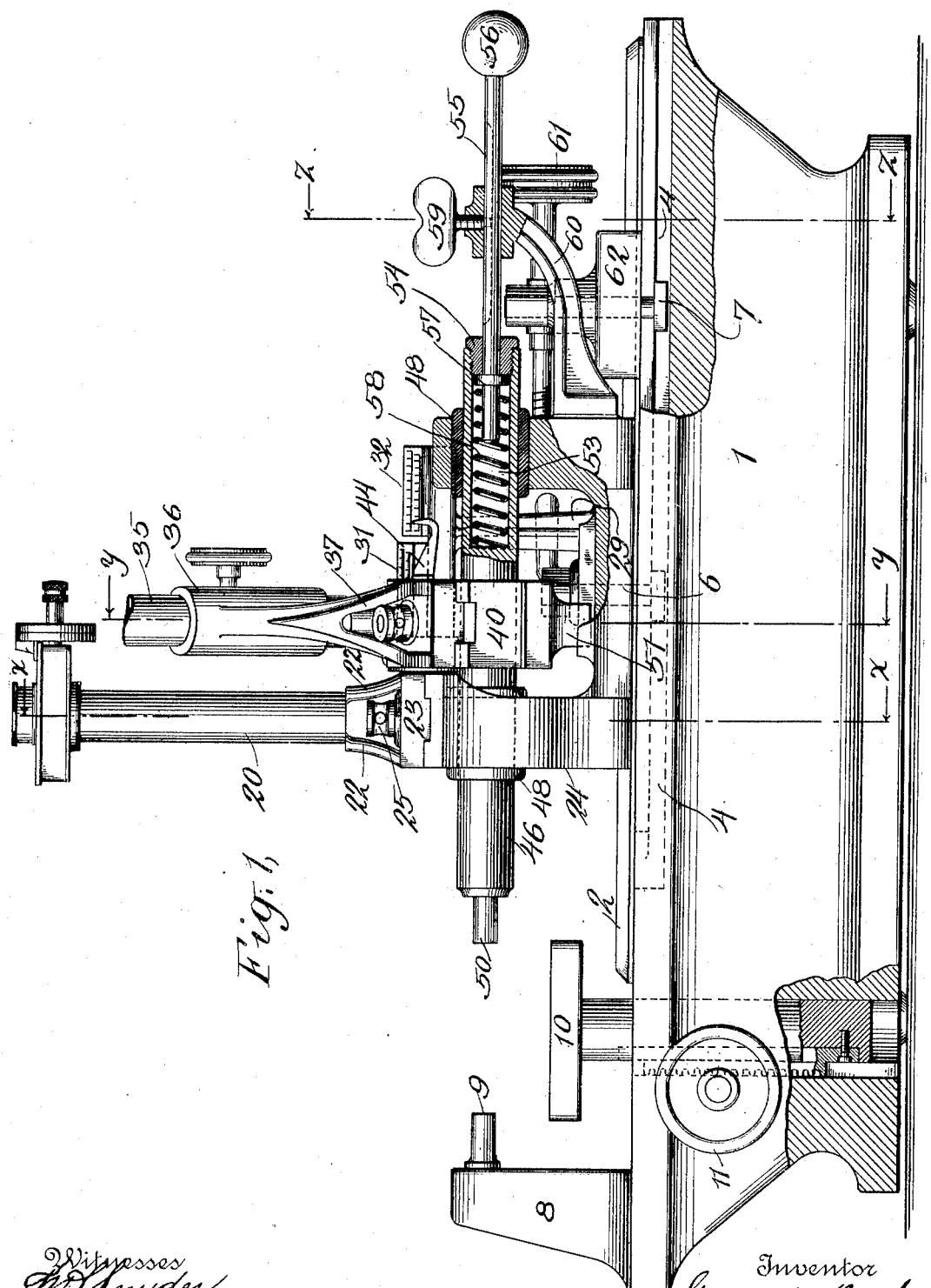

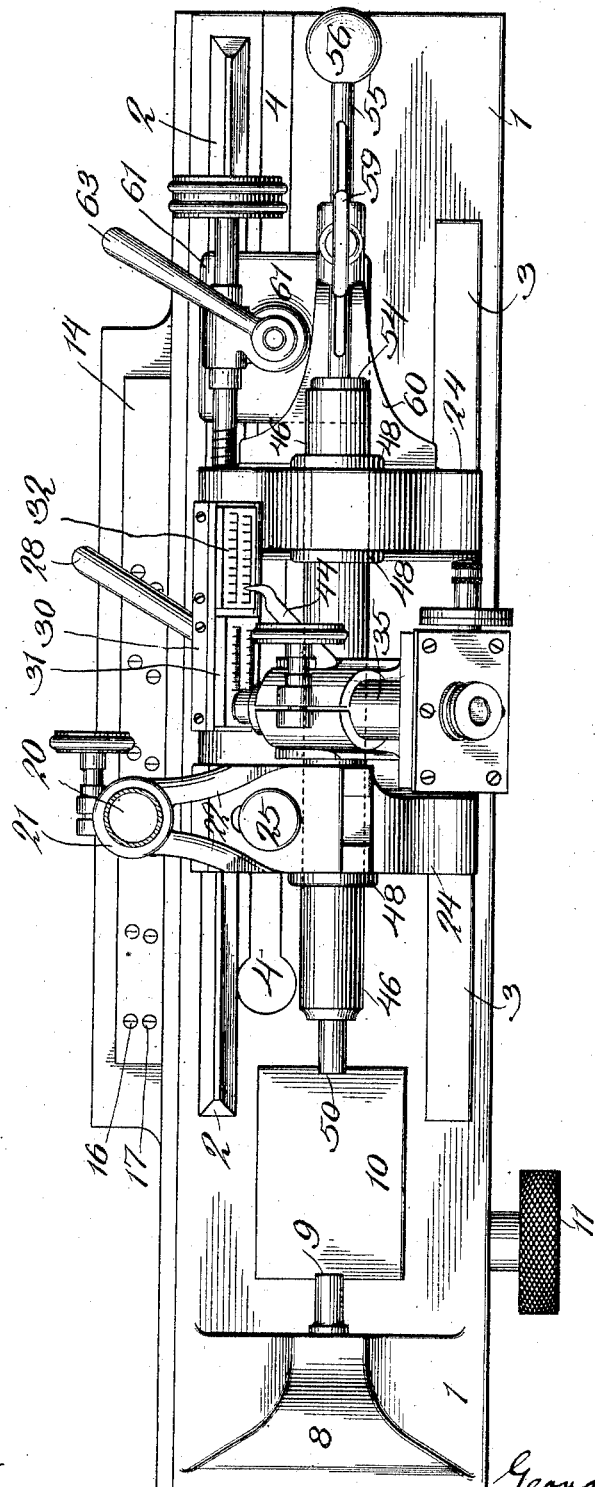

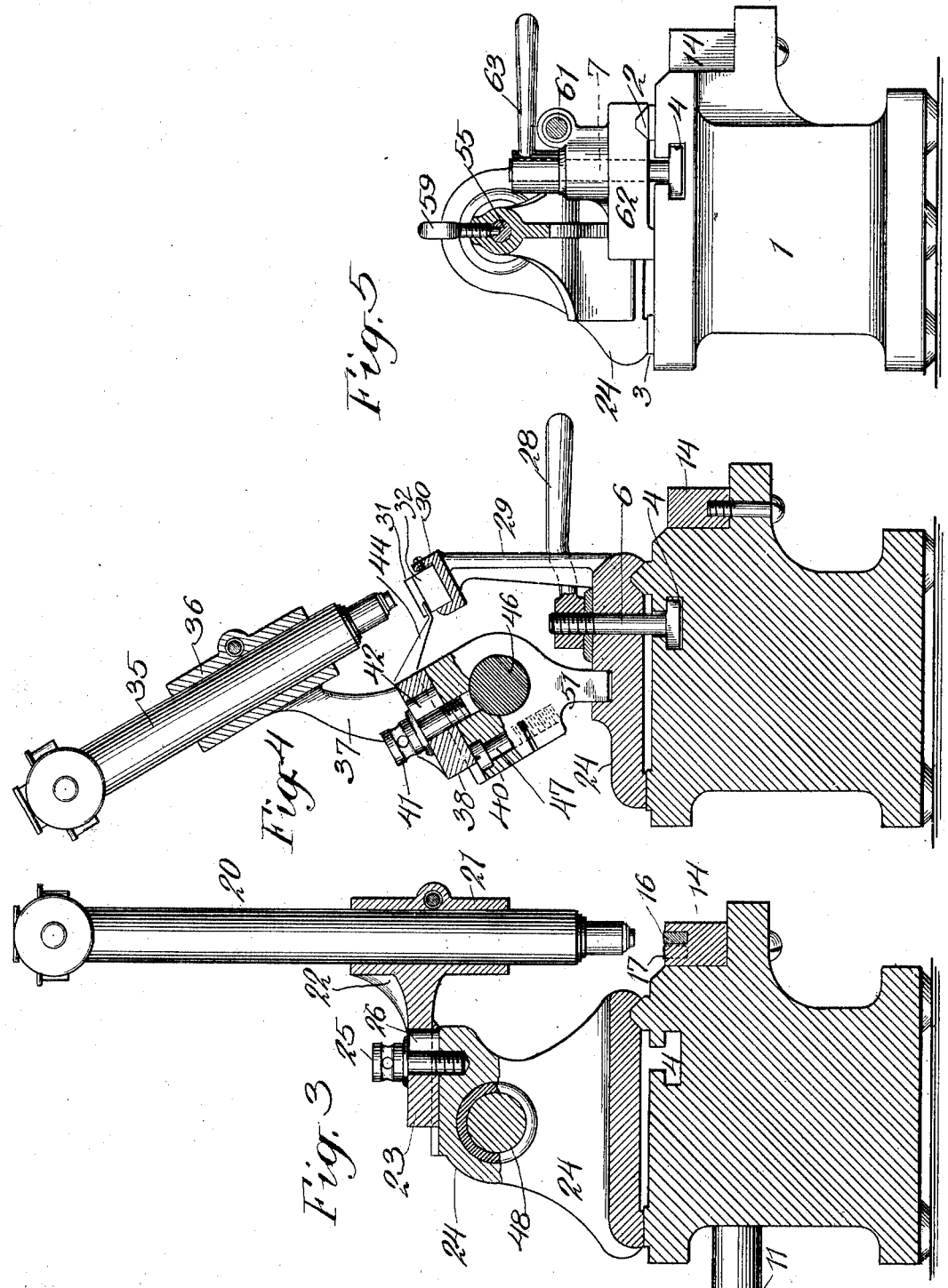

UNITED STATES PATENT OFFICE.

GEORGE M. BOND, OF HARTFORD, CONNECTICUT.

MEASURING-MACHINE.

SPECIFICATION forming part of Letters Patent No. 759,233, dated May 10, 1904.

Application filed May 12, 1903. Serial No. 156,729. (No model.)

*To all whom it may concern:*

Be it known that I, GEORGE M. BOND, a citizen of the United States, and a resident of the city and county of Hartford and State of Connecticut, have invented certain new and useful Improvements in Measuring-Machines, of which the following is a full, clear, and exact description, reference being had to the accompanying drawings, forming part of this specification.

The object of my invention is the construction of apparatus for making the minute measurements, either directly or by comparison, now requisite in the highest class of machine-work, which shall be comparatively inexpensive to construct, simple and direct in its operation, while the accuracy thereof will not be impaired either by variations in temperature or by long use.

In the accompanying drawings, Figure 1 is an elevation, partly in section, of a measuring-machine embodying a preferred form of my invention. Fig. 2 is a plan view thereof. Fig. 3 is a cross-section on the line $x\ x$, Fig. 1. Fig. 4 is a similar view on the line $y\ y$, Fig. 1; and Fig. 5 is a similar view on the line $z\ z$, Fig. 1.

Similar reference characters are employed to designate corresponding parts in all the views.

The particular form of apparatus embodying my invention which I have selected for purposes of illustration and description comprises a bed 1, rectangular in general outline, upon which the various parts of the apparatus are mounted. The bed is provided near one side with a single longitudinally-extending angular guide 2 and near the other side with a flat bearing-surface 3, by and upon which the movable measuring elements of the apparatus are guided. The bed 1 is also provided with a longitudinally-extending slot 4, in which travel the square-headed clamping-bolts 6 and 7, to be hereinafter referred to. An arm 8 is carried by the bed at one end and supports the fixed contact-surface 9. A rest 10, for supporting the object to be measured, is mounted in the bed 1 under the contact-surfaces, and may be adjusted to any desired height by means of a rack and pinion controlled by the operating-head 11.

At the back of the bed, secured upon a suitable support, is a scale-bar 14, upon which each graduation represents a unit of length, such as an inch or twenty-five millimeters or some relatively large fraction thereof, forming a scale which for conciseness of description I term a "unit-scale." Preferably also the bar 14 is provided with both English and metric scales, provision being made for adjusting the reading devices to traverse either one, as desired. The divisions of the scale-bar 14 are marked by plugs 16 and 17, accurately inserted therein, the English scale graduations being traced upon the plugs 16 and those of the metric scale upon the plugs 17. Readings from the graduations on the bar 14 are made by means of a microscope 20, the tube of which is clamped in the holder 21, carried by the arm 22, which terminates in a plate 23, fitted accurately to the head 24 and adjustably secured thereto by means of the set-screw 25, passing through an elongated slot 26 into the head. By this means the microscope 20 may be moved in or out in a line at right angles to the bar 14, so as to bring the hair-line of the micrometer-eyepiece, which forms an indicating device for the scales, accurately over the center of either scale on the bar without necessitating refocusing. The head 24 is fitted to slide on the guide 2 and the plane bearing-surface 3, formed on the bed, and can be firmly clamped in any position to which it may be adjusted by the bolt 6, the squared head of which travels in the slot 4, while the threaded upper end thereof is provided with the clamping-lever 28. By employing a single guide 2 for the sliding head I eliminate the inaccuracy necessarily resulting from the use of two guides, which it is impracticable to construct in perfect parallelism and of the necessary refinement of fitting throughout their length. In the form of apparatus illustrated a bracket 29 is carried by the head 24 and supports a scale-rest 30, Fig. 4, in which two scale-bars 31 and 32 are adjustably but firmly held by set-screws or equivalent devices. The bars 31 and 32, as shown, are each provided with two sets of graduations, one for the English and one for the metric system, and each series of graduations comprises one unit of measurement which corresponds with the respective units on the bar 14. The scales on the bar 31 are graduated to any desired attainable degree of subdivision, while those on the bar 32, which are intended for direct visual reading to save time in adjustments, do not require such minute subdivision. The scales on the bar 31, which I hereinafter refer to as "subdivided scales," are read through the microscope 35, the tube of which is clamped in the holder 36, carried by the arms 37, which terminate in a plate 38, accurately fitted to the carrier 40 and adjustably secured thereto by the set-screws 41. The set-screw 41 passes through an elongated slot 42 in the plate into the carrier, thus permitting the microscope to be adjusted to read on either of the subdivided scales on the bar 31. The eyepiece of the microscope 35 is also provided with a hairline, which forms an indicating device for the scales on the bar 32, and a pointer 44 is secured to the carrier 40 and traverses the scales on the bar 32. The carrier 40 is fitted to the telescopic plunger 46 and is securely clamped thereto by the screw 47. The plunger 46 is accurately fitted to slide in bushings 48 in the head 24 and carries at its inner end the movable contact-surface 50. The carrier 40 is provided with a feather 51, which fits a groove in the base of the head and slides therein, thus permitting the reciprocation of the carrier and the plunger, while preventing any axial rotation thereof. The outer end of the plunger is provided with a longitudinally-extending chamber 53, closed by a bushing 54, in which the pressure-rod 55, carrying the handle 56, is fitted to slide. The pressure-rod is provided with a removable collar 57, which limits the outer movement of the rod and furnishes a bearing for the open coil-spring 58, confined between the collar and the end of the chamber 53. The contact-surface 50 is brought toward the fixed contact 9 by pressure upon the handle 56, and when arrested by an interposed object to be measured or by coming into contact with the fixed surface the spring 58 will yield under the pressure applied to the handle 56, thus enabling the operator to secure uniform pressure of the contact-surfaces, and this contact may be maintained by means of the set-screw 59, carried by the bracket 60, secured to the head.

An adjusting-screw 61 is carried in the sliding bearing 62, which travels on the guide 2, and may be clamped in any position by the clamping-lever 63 and bolt 7. The end of the screw 61 is threaded into the head 24, and by means thereof delicate adjustments of the head 24 and the microscope 20 to the unit-lines of scale-bar 14 may be made.

The operation of the above-described form of apparatus embodying my invention, whether used as a comparator or for determining linear measurements, will now be readily understood. In determining, for instance, the linear measurement of an object greater than the value of the first unit of scale-bar 14, the microscopes having been accurately adjusted to the zero-lines of their respective scales with a certain definite pressure between the contact-surfaces, the head 24 is moved along the bed until the graduation on the unit scale-bar 14 which corresponds with the integer of the measurement to be determined is brought properly into the field of the microscope 20. The plunger 46 is then drawn back sufficiently to permit the insertion of the object between the contact-surfaces. The plunger, carrying the microscope 35, is then moved by pressure applied to the pressure-rod 55 until the contact-surfaces are brought against the object with the same degree of pressure as obtained at zero, and the rod is then, if desired, secured in position by turning the set-screw 59, and the measurement of the fractional part of the unit shown by the microscope 35 is observed and added to the reading of the microscope 20 to determine the total length of the object, the reading of the subdivided scale being assisted or checked by direct visual observation of the position of the index-pointer 44 on the scale-bar 32.

It is evident from the foregoing description that for all measurements of one unit and under the operation would consist in simply reading the subdivided scale-bar 31 after having determined for each the proper or definite degree of pressure at the zero contact position of surfaces 9 and 50 and the coincidence of the line of the microscope and the initial or zero line of the scale-bar 31.

As will be understood, the unit reference-bar may be of any practicable length, according to the desired capacity of the machine. It will, for instance, be entirely practicable to construct these machines having a capacity exceeding eighty inches. A reference-bar of this length, graduated only for units or large fractions of units of length, can be accurately made without difficulty and at relatively small expense, so that a number of such bars made of different materials, corresponding with and having the same coefficient of expansion as the materials of the different objects to be measured, may be provided for each machine, while a bar of this length, graduated to the fineness of subdivision required if the complete reading were made from this one scale, could only be constructed, if it could be accurately constructed, at great and practically prohibitive cost. Likewise the subdivided scales on the bar 31, which need be graduated for only one unit of length, may be accurately made and at but comparatively slight expense, so that a number of these scales may also be provided for each machine.

All the determining movements of this machine depend entirely upon rectilinear action, and I am thus entitled to avoid in these movements the use of any screw-threaded or rotary parts the accuracy of which is seriously affected by even slight wear, and I also dispense entirely with the employment of graduated index-circles and similar parts by taking the readings directly from linear scales in relatively fixed positions. For these reasons measurements made on my machine must necessarily be exact if with the microscope reading at zero the contact-surfaces are brought properly together, and this would be true even after long-continued use of the machine.

My machine is adapted for all the uses for which a measuring apparatus may be needed. It may be used for originating standard end or cylindrical gages, for comparing the measurement of gages or other objects with fixed standards, and for making original measurements.

Having thus described my invention, what I claim as new, and desire to secure by Letters Patent, is—

1. In a measuring-machine, the combination of a movable head, a unit-scale, an indicating device for the unit-scale carried by said head, a longitudinally-movable plunger mounted on and supported by said head and carrying a contact-surface, a subdivided scale in parallel relation to the axis of the plunger, an indicating device for said subdivided scale and means for imparting relative movement to said indicating device and the subdivided scale by the longitudinal movement of the plunger.

2. In a measuring-machine the combination with a stationary and a movable contact, of a unit-scale, a microscope arranged to traverse the same, a subdivided scale having a fixed operative position relatively to the said microscope, and a microscope having a fixed operative position relative to the moving contact and arranged to traverse the subdivided scale.

3. In a measuring-machine the combination of a movable head, a unit-scale, a microscope carried by said head and arranged to traverse the unit-scale, a longitudinally-movable plunger mounted on said head and carrying a contact-surface, a subdivided scale in parallel relation to the axis of the plunger, a microscope traversing said subdivided scale, and means for imparting relative movement to the last-named microscope and scale by the longitudinal movement of the plunger.

4. In a measuring-machine, the combination of a movable head, a unit-scale, a microscope carried by said head and arranged to traverse the unit-scale, a subdivided scale carried by said head in fixed operative position relatively thereto, a longitudinally-movable plunger mounted in said head, and a microscope carried by said plunger and arranged to traverse the subdivided scale.

5. In a measuring-machine, the combination of a unit-scale, a microscope therefor, a subdivided scale, a microscope therefor, an auxiliary scale corresponding to the subdivided scale and an index-pointer arranged to show by visual reading the relative positions of the subdivided scale and its microscope.

6. In a measuring-machine, the combination of a scale-bar provided with a plural series of graduations of different values, a subdivided scale provided with a corresponding plural series of graduations, a microscope for each of said scales and means for adjusting said microscopes to traverse either series of graduations.

7. In a measuring-machine, the combination of a bed, a movable head, a single ∧-shaped guide formed integrally with the bed and arranged near one side of the head, a flat bearing-surface on the bed for the opposite side of the head and a clamping device which engages with the head and the bed between the guide and the bearing-surface.

GEORGE M. BOND.

Witnesses:
ROBT. B. KILLGORE,
O. H. GLENDINNING.